Patented Dec. 5, 1950

2,532,497

UNITED STATES PATENT OFFICE 2,532,497

PREPARATION OF INORGANIC OXIDE PARTICLES

James Hoekstra, Chicago, Ill., assignor to Universal Oil Products Company, Chicago, Ill., a corporation of Delaware No Drawing. Application May 28, 1947,
Serial No. 751,125

15 Claims. (Cl. 252—448)

1

This invention relates to the preparation and use of inorganic oxide particles and more particularly to a novel method of preparing catalyst particles of low density and of improved distribution of pores. These catalysts are particularly suitable for use in hydrocarbon conversion reactions.

It has been established that catalysts of low density when used, for example, in the cracking of higher boiling hydrocarbons to produce lower boiling hydrocarbons and particularly gasoline, have a higher weight activity and produce less coke than higher density catalysts of the same composition. These advantages are believed to be due to the higher porosity of the low density catalyst. However, not only are the number of pores in the catalyst particle important, but also the distribution and size of the pores are important in order that the large hydrocarbon molecules in the charging stock may have ready access into, and are readily removed from, the interior of the catalyst particles. When catalysts are prepared in the conventional manner, there apparently is a random distribution of pore sizes and thus will include pores which are so small as to prevent access of the large hydrocarbon molecules, but will permit access of the smaller molecules produced by cracking of the larger molecules. The smaller molecules as, for example, of gasoline range may become stagnated within the pores of the catalyst particle and there react further to produce gas and coke.

The present invention is directed to a novel method of controlling the distribution of pore sizes throughout the catalyst particles and thereby produce catalysts which will yield higher gasoline productions with lower yields of gas and coke.

In a broad embodiment the present invention relates to an improved method of preparing inorganic oxide particles, which comprises forming catalyst particles and, before the particles have been subjected to substantial drying, commingling a surface active agent therewith, and thereafter drying said particles in the presence of said surface active agent.

When the catalyst particles are subjected to drying, the particles undergo shrinkage due to the evaporation of water, and thereby fix the internal structure of the particle. In accordance with the present invention, this drying is effected in the presence of a surface active agent which serves to control the number and size of pores es'ablished during shrinkage of the catalyst particle.

2

It is believed that the surface tension of the water is one of the most important factors in the shrinkage which takes place during drying of the catalyst particles. The addition of a surface active agent will considerably reduce the surface tension and thereby reduce the strain of the catalyst particle structure during the drying operation. This, therefore, decreases the amount of shrinkage which occurs during drying and thereby controls the pore size and distribution. However, it is understood that the above is merely a theoretical explanation for the improved results obtained in accordance with the present invention and is not meant to unnecessarily limit the broad scope of the present invention.

The surface active agent may be added either before or after forming of the catalyst particles, but in any event is added prior to any substantial drying of the catalyst particles so that the surface active agent is present during the drying treatment and thereby serves to control the amount and type of shrinkage which occurs during the drying treatment.

In one specific embodiment of the invention the surface active agent may be added to the reactants prior to formation of the catalyst particle. Thus, for example, in the formation of silica particles by reacting an alkali metal silicate, such as water glass, with a suitable acid such as sulfuric acid, hydrochloric acid, etc., the surface active agent may be added along with either one of the reactants or as a separate stream into the reaction mixture.

In another embodiment of the invention, as applied to the manufacture of catalysts comprising an association of silica and a metal oxide, the silica may be formed in any suitable manner, such as by the reaction of water glass and an acid as hereinbefore set forth, and a surface active agent added to the silica particles so formed, before drying of the silica particles.

In still another embodiment of the invention as applied to the manufacture of composite catalysts as hereinbefore set forth, the silica particles may be formed and then composited with a suitable metal oxide, as, for example, by the addition of aluminum sulfate, aluminum chloride, magnesium sulfate, magnesium chloride, zirconium sulfate, zirconium chloride, or other suitable salts of these or other catalytically active metals, and the corresponding oxide precipitated by the addition of a suitable basic precipitant such as ammonium hydroxide, sodium hydroxide, etc. The surface active agent is then added to the composite before it is subjected to a drying treatment.

The present invention is aplicable to the preparation of inorganic oxide particles which are formed in a hydrous condition and are subsequently subjected to a drying treatment in order to evaporate water and form firm particles. The invention is particularly applicable to gel type particles as exemplified by silica and composite catalysts containing silica. These catalysts are particularly suitable for hydrocarbon conversion reactions and still more particularly to the cracking of higher boiling hydrocarbons to form lower boiling hydrocarbons as, for example, in the cracking of heavy naphtha, kerosene, gas oil, fuel oil, etc. to form gasoline. The composite catalysts used generally comprise an association of silica with alumina, zirconia, magnesia, thoria, etc., or mixtures thereof, such as silica-alumina-zirconia, silica-alumina-magnesia, silica-alumina-thoria, etc.

The invention is also of particular advantage for the preparation of highly porous silica particles in which a low density product of controlled pore size is desired. These silica particles have innumerable uses, including use as a desiccator, adsorbent to selectively separate different components of a mixture of gaseous or liquid organic and/or inorganic compounds, etc.

The invention is particularly applicable to spherical shaped catalyst particles. While comparatively large spheres of from about $\frac{1}{32}$ to about ¼ inch in diameter may be employed, preferred spheres are of microspherical size and range from about 20 to about 150 microns in diameter. Silica spheres are readily manufactured by commingling a suitable acid with an alkali metal silicate, particularly water glass, and then passing the mixture in the form of droplets through a nozzle or from a rotating disc into an oil bath, the pH of the mixture being controlled so that the silica sets to a firm hydrogel during passage through the bath. When silica spheres are desired, the silica may be washed if necessary, a surface active agent added and the spheres dried. If composite catalysts are desired, the silica, either without washing to remove sodium ions, may be composited with a metal oxide as hereinbefore set forth, washed to remove sodium ions or washed for other purposes if desired, the surface active agent added and the composite spheres then are subjected to drying.

The invention will also find utility in the preparation of catalytic composites used for other hydrocarbon reactions. For example, catalyst composites comprising an association of alumina with the oxides of chromium, molybdenum, vanadium, etc., are particularly suitable for dehydrogenation, aromatization and similar reactions. In these processes it is also desirable to utilize catalyst particles of controlled pore size, which catalysts may be readily prepared in accordance with the teachings of the present invention.

Other catalysts to which the features of the present invention are particularly advantageous include composites of silica or silica and metal oxide with metals such as platinum, palladium, iron, nickel, cobalt, etc. In general, the metal is used in minor proportions, especially the more expensive metals, such as platinum, which are usually used in very low concentrations.

The surface active agent of the present invention is defined as any substance which, when added to water, will reduce its surface tension. Particularly suitable surface active agents comprise soaps and particularly the fatty acid soaps such as the sodium, potassium and lithium salts of such fatty acids as oleic, linoleic, stearic, linolinic and palmitic acids, etc. Other suitable organo-metallic compounds include the so-called soapless detergents such as (1) the alkylsulfonate salts as, for example, sodium cetanesulfonate, sodium laurylsulfonate, etc., (2) the alkanol sulfate esters such as the monosodium salts of the sulfate esters of octyl, lauryl and cetyl alcohols, etc., (3) the aralkyl sulfonates of both the mono- and polynuclear aromatics and their homologs as, for example, the alkali metal salts of decyl-, dodecyl-, hexadecyl-, and octyldecyl-benzene sulfonic acid, sodium tetralinsulfonic acid and sodium isopropyl-naphthalenesulfonic acid, etc., (4) the alkali metal salts of the sulfonated fatty acid glycerides, such as the sodium and potassium salts of the triglyceride esters of oleic, stearic, palmitic and margaricsulfonic acids, (5) the alkylated phenolsulfonates such as the sodium sulfonate salt of butylphenylphenol, etc., (6) the alkylaminesuccinate and sulfosuccinate salts such as the alkali metal salts of dioctylsulfosuccinate, etc., (7) the alkyl, aromatic and alkylaromatic phosphonate salts such as sodium laurylphosphonate, sodium dodecylbenzenephosphonate, etc., (8) the alkali metal sulfonate salts of carboxamide derivatives such as the sodium sulfonate salt of dimethyloleylamide, etc., other suitable surface active agents include quaternary ammonium salts such as oleyl or stearyltrialkylammonium chloride or bromide, alkyldimethylbenzylammonium chloride or bromide, etc., and, in some cases, organic acids such as acetic acid, valeric acid, butyric acid, stearic acid, oleic acid, palmitic acid, etc., or soluble amine compounds such as ammonia, alkylamines, etc.

It is understood that the above is merely a partial enumeration of the various active surface agents which may be employed within the broad scope of the present invention but not necessarily with equivalent results.

The quantity of surface active agent to be employed will depend upon the particular surface active agent utilized and upon the particular inorganic oxide particle being prepared. It has been found that as little as 0.01% of the surface active agent will form a solution having a surface tension as low as 25 dynes/cm., while that of pure water is 73 dynes/cm. On the other hand in some cases it may be desirable to utilize a considerably larger quantity of surface active agent in order to obtain larger pores. The soap molecules are grouped together to form aggregates known as micelles and these micelles determine the number and size of pores within the catalyst particle. In general, however, it will be unnecessary to employ a quantity of soap in excess of 25% by weight of either the reactants utilized to form the inorganic oxide particles or of the particles themselves.

It has also been found that the addition of an inorganic salt, such as sodium chloride, permits the use of smaller quantities of surface active agent. For example, the addition of 0.25% by weight of sodium chloride, when added to the surface active agent solution, reduced the quantity of surface active agent required to as low as 0.01% by weight of the inorganic oxide particle. It is understood that other inorganic salts may be employed such as sodium bromide, sodium iodide, potassium chloride, potassium bromide, potassium iodide, etc.

As hereinbefore set forth, in the preparation of hydrocarbon conversion catalysts, it is necessary to remove alkali metal ions introduced through the use of alkali metal silicates in forming the silicate particles. The sodium ions may readily be removed by washing with acidulated water. It is generally preferred to remove the sodium ions prior to the addition of the surface active agent or after the first drying treatment described in the next paragraph in order to avoid washing out the surface active agent during the washing step. If the washing step is done after the surface active agent had been added it would be necessary to add additional surface active agent in order to be certain there is a desired quantity of surface active agent present during the drying of the catalyst particles.

The inorganic oxide particles containing surface active agent may be dried at a temperature of from about 150° to about 500° F. for a period of from about 6 to 24 hours or more. During this drying treatment substantial shrinkage of the particle occurs and the pores are substantially set. The dried material may then be washed with water or otherwise to remove the surface active agent, the particles may then be given a second drying treatment at a temperature of from about 150° to about 500° F. for a period of from about 2 to about 12 hours or more, and then finally calcined at a temperature of from about 800° to about 1200° F. from a period of about 1 to 12 hours or more.

As hereinbefore set forth the silica-metal oxide composites are particularly suitable for catalytic cracking reactions, which generally are effected at a temperature of from about 800° to about 1100° F. at superatmospheric pressures ranging from atmospheric to about 50 pounds or more per square inch. Catalytic dehydrogenation is generally effected at a temperature of from about 900° to about 1200° F., either in the presence or absence of hydrogen and generally at pressures below 100 pounds per square inch. Reforming of gasoline to improve its antiknock properties is generally effected at temperatures within this range but at pressures of from about 100 to 500 pounds per square inch.

The process of the present invention may be effected in any suitable equipment. Catalytic cracking units are well known in the art and, therefore, do not require detailed description. In general, the fluidized process includes a reactor, a regenerator and fractionating equipment. The temperature of the hot regenerated catalyst is usually sufficient to vaporize and crack the charging oil in the reactor. The spent catalyst is withdrawn from the reactor and supplied to the regenerator wherein carbon is burned from the catalyst by means of air or other oxygen-containing gases. The hydrocarbon products, after separation from the catalyst by means of cyclone separators, Cottrell precipitators or otherwise, are subjected to fractionation for the recovery of gases, gasoline and higher boiling products. The normally gaseous products will be high in olefins and therefore may be subjected to polymerization, alkylation or other reactions to increase the volume of high octane gasoline.

The following examples are introduced to further illustrate the novelty and utility of the present invention but not with the intention of unduly limiting the same.

Silica-alumina spheres were prepared as follows: N-brand sodium silicate solution (9.0% $Na_2O$-28.6% $SiO_2$), diluted to a specific gravity of 1.2, and dilute sulfuric acid of 1.06 specific gravity were fed as continuous streams into a mixing chamber. The mixture flowed onto the surface of a rotating disc at the surface of a body of oil and was dispersed into the body of oil in the form of small droplets. The spheres of silica hydrogel thus formed settled into a body of water on which the body of oil was supported. These spheres were then soaked for about 1 hour in a solution of aluminum sulfate of 1.13 specific gravity. After the aluminum sulfate solution had been drained off, the spheres were covered with a dilute ammonia solution (7% $NH_3$). The silica-alumina hydrogel spheres were then washed with water to remove soluble salts, especially sodium sulfate.

*Catalyst #1.*—About 300 cc. of the wet silica-alumina spheres (equivalent to about 35 g. of dry catalyst) were covered with 100 ml. of water and allowed to stand for 24 hours. Following this, the excess water was drained from the spheres and they were dried in an oven at 195° F. The dried spheres were then soaked in several changes of water over a period of 2 days after which they were again dried and then calcined for 1½ hours at 1112° F. in a muffle furnace.

*Catalyst #2.*—About 300 cc. of the wet silica-alumina spheres (equivalent to about 35 g. of dry catalyst) were covered with 100 ml. of a 4% solution of Nacconol (sodium salt of an alkyltoluenesulfonic acid), and allowed to stand for 24 hours. The excess solution was drained from the spheres, and the spheres were dried in an oven at 195° F., washed by decantation over a period of 2 days to remove the Nacconol, dried and calcined for 1½ hours at 1112° F.

*Catalyst #3.*—The procedure used in preparing this catalyst was the same as that used in the case of catalyst #2, except that 20 g. of sodium sulfate were added to the Nacconol solution before soaking the spheres in it.

Each of the above catalysts was utilized for the cracking of a 31° A. P. I. gravity Mid-Continent gas oil at a temperature of 932° F., atmospheric pressure and at a liquid hourly space velocity (defined as the volume of liquid charging stock per hour per unit volume of catalyst) of 4. The results of these tests are indicated in the following table:

| Cat. No. | Apparent Bulk Density, g./cc. | Gaso.,[1] Weight Per Cent Charge | Gas,[1] Weight Per Cent Charge | Coke, Weight Per Cent Charge | Conv., Weight Per Cent Charge | Coke, Weight Per Cent of Charge Adjusted to 25% Conv. | Activity | |
|---|---|---|---|---|---|---|---|---|
| | | | | | | | Volume Per Cent | Weight Per Cent |
| 1 | .48 | 17.2 | 5.8 | .48 | 22.9 | .54 | 64 | 67 |
| 2 | .40 | 17.0 | 5.7 | .38 | 22.5 | .43 | 62 | 78 |
| 3 | .43 | 18.4 | 5.9 | .44 | 24.2 | .46 | 69 | 80 |

[1] Yields are reported on a 100 weight per cent recovery basis.

It will be noted that, on the basis of 25% conversion, the amount of coke produced by catalyst #2 was 0.43% as compared to 0.54% produced by catalyst #1. This amounts to a decrease in coke production of approximately 21%. It is readily recognized that this great reduction in coke is a definite advantage in commercial catalytic cracking plants as, it not only means that the plant equipment and particularly the regeneration system may be reduced 20%, but also that the ultimate gasoline production is increased accordingly because the gas oil is converted into gasoline instead of being wasted as coke.

I claim as my invention:

1. A method of preparing silica particles of low density and of substantially evenly distributed uniform pores, which comprises commingling an acid, an alkali metal silicate and a soap solution containing at least 0.01% of an alkali metal soap, reacting the mixture under a pH controlled to form silica particles containing soap molecules, thereafter drying the same to form firm silica particles, and washing the dried particles to remove soap molecules.

2. A method of preparing silica spheres of low density and of substantially evenly distributed uniform pores, which comprises commingling an acid, an alkali metal silicate and a soap solution containing at least 0.01% of an alkali metal soap, dispersing the mixture into a liquid medium at a pH controlled to form firm silica spheres, thereafter drying said spheres, and washing the dried spheres to remove soap molecules.

3. A method of preparing a catalyst which comprises commingling an acid, an alkali metal silicate and a soap solution containing at least 0.01% of an alkali metal soap, reacting the mixture under a pH controlled to form silica particles containing soap molecules, compositing said silica particles with a catalytically active component, thereafter drying the composite containing soap molecules to form firm catalyst particles, and washing the dried particles to remove soap molecules.

4. A method of preparing a catalyst which comprises commingling an acid, water glass and a soap solution containing at least 0.01% of an alkali metal soap, dispersing the mixture into a liquid medium at a pH controlled to form firm silica spheres, commingling a catalytically active component with these spheres while still retaining the soap molecules in the composite, drying the composite at a temperature of from about 150° to about 500° F., washing to remove soap molecules, and thereafter calcining the composite at a temperature of from about 800° to about 1200° F.

5. The process of claim 3 further characterized in that said catalytically active component comprises alumina.

6. The process of claim 3 further characterized in that said catalytically active component comprises magnesia.

7. The process of claim 3 further characterized in that said catalytically active component comprises zirconia.

8. A method of preparing a silica-metal oxide catalyst which comprises commingling water glass and an acid, dispersing the mixture of water glass and acid into a liquid medium at a pH controlled to form firm silica spheres, compositing the silica spheres with a catalytically active metal oxide, washing the mixture to remove alkali metal ions, commingling with the composite a soap solution containing at least 0.01% of an alkali metal soap, drying the same at a temperature of from about 150° to about 500° F., washing the dried composite to remove soap molecules, and thereafter calcining the composite at a temperature of from about 800° to about 1200° F.

9. The method of claim 8 further characterized in that said catalytically active metal oxide comprises alumina.

10. The method of claim 8 further characterized in that said catalytically active metal oxide comprises magnesia.

11. The method of claim 8 further characterized in that said catalytically active metal oxide comprises zirconia.

12. In the preparation of inorganic oxide particles, the improvement which comprises commingling with hydrated inorganic oxide gel particles, prior to drying thereof, a surface active agent solution containing at least 0.01% of a salt of an alkali metal organic compound, thereafter drying said particles containing said salt, and washing the dried particles to remove surface active compound.

13. The improvement of claim 12 further characterized in that said salt is an alkali metal soap.

14. The improvement of claim 12 further characterized in that said inorganic oxide particles comprise silica.

15. A method of preparing inorganic oxide particles of low density and of substantially evenly distributed uniform pores, which comprises forming hydrated inorganic oxide gel particles in the presence of a surface active agent solution containing at least 0.01% of a salt of an alkali metal organic compound, thereafter drying said particles containing said salt, and washing the dried particles to remove surface active compound.

JAMES HOEKSTRA.

REFERENCES CITED

The following references are of record in the file of this patent:

UNITED STATES PATENTS

| Number | Name | Date |
|---|---|---|
| 1,748,315 | Stoewener | Feb. 25, 1930 |
| 1,896,320 | Luft | Feb. 7, 1933 |
| 2,093,454 | Kistler | Sept. 21, 1937 |
| 2,211,208 | Ipatieff et al. | Aug. 13, 1940 |
| 2,384,946 | Marisic | Sept. 18, 1945 |
| 2,442,884 | Webb et al. | June 8, 1948 |

FOREIGN PATENTS

| Number | Country | Date |
|---|---|---|
| 222,279 | Great Britain | Oct. 2, 1924 |